United States Patent [19]

Fujisaka et al.

[11] Patent Number: 5,216,419
[45] Date of Patent: Jun. 1, 1993

[54] DATA CARRIER IDENTIFICATION SYSTEM

[75] Inventors: Hisato Fujisaka, Kyoto; Ryoichi Miyake, Kameoka; Tunetaka Shimada, Takatsuki, all of Japan

[73] Assignee: Omron Tateisi Electronics Co., Kyoto, Japan

[21] Appl. No.: 285,099

[22] Filed: Dec. 16, 1988

[30] Foreign Application Priority Data

Dec. 17, 1987 [JP] Japan .................. 62-320007
Dec. 18, 1987 [JP] Japan .................. 62-322389

[51] Int. Cl.⁵ .................. H04Q 7/00; H04Q 9/00; H04Q 11/00; G08B 13/00
[52] U.S. Cl. .................. 340/825.54; 340/825.52; 340/572; 379/62; 455/33.1
[58] Field of Search .................. 340/825.54, 825.52, 340/572; 379/60, 62; 455/33; 342/51

[56] References Cited

U.S. PATENT DOCUMENTS

| | | | |
|---|---|---|---|
| 4,510,495 | 4/1985 | Sigrimis et al. | 340/825.54 |
| 4,630,044 | 12/1986 | Polzer | 340/825.54 |
| 4,631,708 | 12/1986 | Wood et al. | 340/825.54 |
| 4,638,313 | 1/1987 | Sherwood, Jr. et al. | 340/825.52 |
| 4,680,583 | 7/1987 | Grover | 455/33 |
| 4,691,202 | 9/1987 | Denne et al. | 340/825.54 |
| 4,742,470 | 5/1988 | Juengel | 340/825.54 |
| 4,817,190 | 3/1989 | Comroe et al. | 340/825.52 |
| 4,818,855 | 4/1989 | Mongeon et al. | 340/825.54 |
| 4,825,204 | 4/1989 | Nakamura | 340/825.52 |

*Primary Examiner*—Donald J. Yusko
*Assistant Examiner*—Brian Zimmerman
*Attorney, Agent, or Firm*—Dickstein, Shapiro & Morin

[57] ABSTRACT

This invention is directed to a data carrier identification system which is used, for example, in production lines. Different data carrier identification numbers (DCNos.) are assigned to respective different data carriers in an access enable area where data carriers can communicate with a central controller. The different DCNos. allow the controller to correctly access a specific data carrier even if more than one data carrier exists in an access enable area. When a new data carrier enters the access enable area its data carrier identification number is checked by the controller to determine if another data carrier already in the area has the same data carrier identification number and, if so, the controller instructs one or more of the data carriers to change their data carrier identification number so that no two data carriers within the access area have the same data carrier identification number.

1 Claim, 16 Drawing Sheets

READ COMMAND

| SYNCHRONIZATION CHARACTER | DC No | READ CODE | BYTE COUNT | ADDRESS |

FIG. 3A(a)

WRITE COMMAND

| SYNCHRONIZATION CHARACTER | DC No | WRITE CODE | BYTE COUNT | ADDRESS | DATA 1 | DATA 2 |

| DATA n | CHECK BIT |

FIG. 3A(b)

STATUS READ

| SYNCHRONIZATION CHARACTER | DC No. MASTER No. | STATUS READ |

FIG. 3A(c)

READ RESPONSE

| SYNCHRONIZATION CHARACTER | DC No | STATUS | DATA 1 | DATA 2 | DATA n | CHECK BIT |

FIG. 3A(d)

WRITE RESPONSE

| SYNCHRONIZATION CHARACTER | DC No | STATUS |

FIG. 3A(e)

STATUS READ RESPONSE

| SYNCHRONIZATION CHARACTER | DC No | STATUS |

FIG. 3A(f)

| No. UPDATE PERMITTING COMMAND | SYNCHRONIZATION CHARACTER | DC No MASTER No | No CE |

FIG. 3B(a)

| No. UPDATING COMMAND | SYNCHRONIZATION CHARACTER | DC No | No C | NEW No |

FIG. 3B(b)

| No. UPDATE INHIBITING COMMAND | SYNCHRONIZATION CHARACTER | DC No MASTER | No CD |

FIG. 3B(c)

| RESPONSE | SYNCHRONIZATION CHARACTER | DC No | STATUS |

FIG. 3B(d)

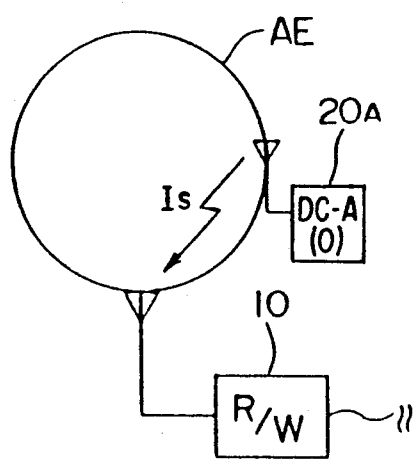
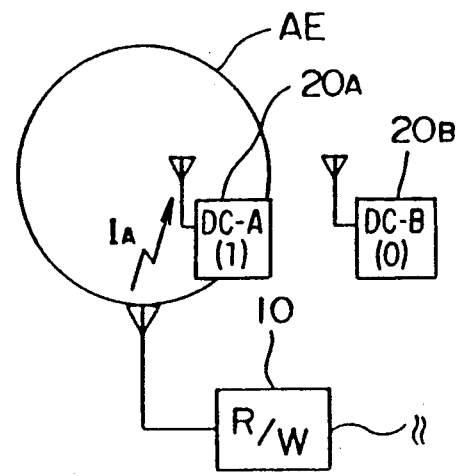
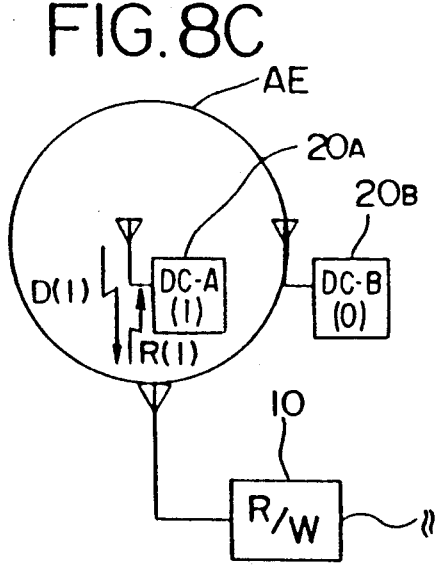
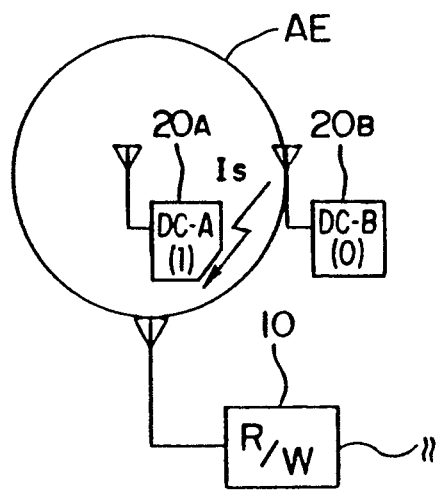
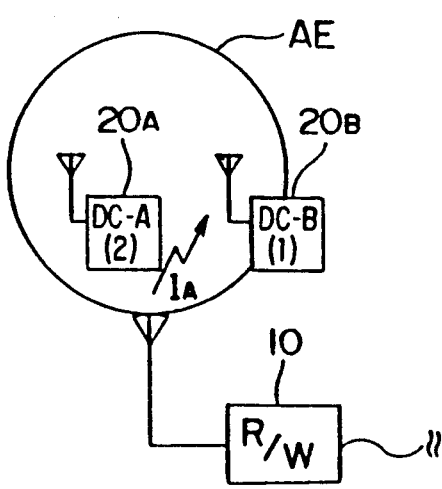
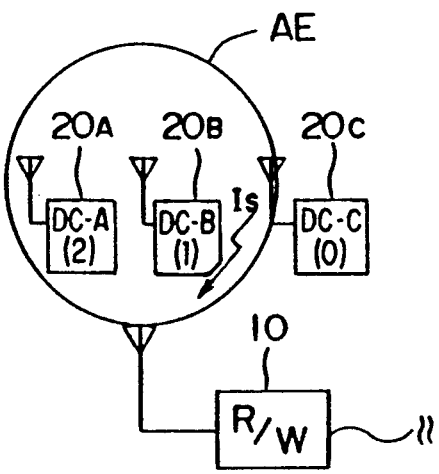

READ COMMAND | SYNCHRONIZATION CHARACTER | DC No | READ CODE | BYTE COUNT | ADDRESS

FIG. 9A

WRITE COMMAND | SYNCHRONIZATION CHARACTER | DC No | WRITE CODE | BYTE COUNT | ADDRESS | DATA 1 | DATA 2

FIG. 9B

| DATA n | CHECK BIT |

STATUS READ | SYNCHRONIZATION CHARACTER | DC No. MASTER No. | STATUS READ

FIG. 9C

READ RESPONSE | SYNCHRONIZATION CHARACTER | DC No | STATUS | DATA 1 | DATA 2 | DATA n | CHECK BIT

FIG. 9D

WRITE RESPONSE | SYNCHRONIZATION CHARACTER | DC No | STATUS

FIG. 9E

STATUS READ RESPONSE | SYNCHRONIZATION CHARACTER | DC No | STATUS

FIG. 9F

DC No + 1 COMMAND | SYNCHRONIZATION CHARACTER | MASTER No DC No. | NINC.

FIG. 9G

DATA CARRIER IDENTIFICATION SYSTEM

BACKGROUND OF THE INVENTION a) Field of the Invention

This invention relates to a data carrier identification system, and more particularly, to a data carrier identification system which employs a communication controller for reading and writing data from and into one or more data storing unit(s) which carry data for the control of production lines, conveyor systems, room access control, the movement of livestock, etc.

b) Discussion of the Related Art

Identification systems, which read or write data from and into a data storing unit (hereinafter data carrier) from a controller and using electromagnetic induction, radio waves, or light rays are known. A data carrier including a semiconductor memory such as an EEPROM or SRAM (Static RAM) is mounted on articles which are moved, for example, on a production line. After an article comes into an area where data communication with the controller is possible, the controller begins to communicate with the data carrier using, for example, a reading/writing head.

During data reading, the controller transmits a command code, and a read command including an address to a data carrier. The data carrier reads data from its storage unit in response to the read command and transmits the data to the controller. During data writing, the controller sends a command code, and a write command including an address and the data to be written. The data carrier writes the data into its storage device in response to the write command.

In this system, if more than one data carrier is present in an area where data communication with the controller is possible, correct data communication is difficult because a data carrier which is expected to communicate with the controller cannot be differentiated from other data carriers in the same vicinity. Accordingly, to achieve correct communication, objects must be controlled to enter a communication area one-by-one, and accurate positioning of the read/write head of the controller is required.

In addition, for the control of people entering and leaving a room, a path and a gate are required for guiding people one-by-one into a communication area. This is also true for livestock control. Additional devices or facilities are thus required for correct communication.

c) Summary of the Invention

It is, therefore, an object of this invention to provide a data carrier identification system in which a controller can correctly communicate with a data carrier, even if more than one data carrier is present in a communication area.

According to this invention, a data carrier identification system is provided in which different data carrier numbers (DCNos.) are assigned to different data carriers in a communication area where data communication with the controller is possible. The different DCNos. allow easy and correct access by the controller to a specific data carrier which is expected to communicate with it, even if more than one data carrier is present in a communication area.

When a data carrier newly entering the communication area has a data carrier number which is the same as the data carrier number of a data carrier already in the area a controller causes a change in the data carrier number of at least one of conflicting data carriers so that no two data carrier numbers have the same data carrier number.

BRIEF DESCRIPTION OF THE DRAWINGS

The above and other objects, advantages and features of this invention will be more fully understood from the following detailed description of the invention which is provided in conjunction with the following drawings, in which like numerals designate like or corresponding components:

FIGS. 3A(a)–3A(f) and 3B(a)–3B(d) shows command message structures from a controller and response message structures from a data carrier for the first embodiment;

FIGS. 6A, 6B and 6C are flow charts describing operation of the controller in a first embodiment of the invention;

FIGS. 8A to 8H are illustrations representing a data carrier identification system in a second preferred embodiment of this invention;

FIG. 9A–9G shows command message structures from a controller and response message structures from a data carrier for the second embodiment;

DETAILED DESCRIPTION OF THE INVENTION

Figure 2:
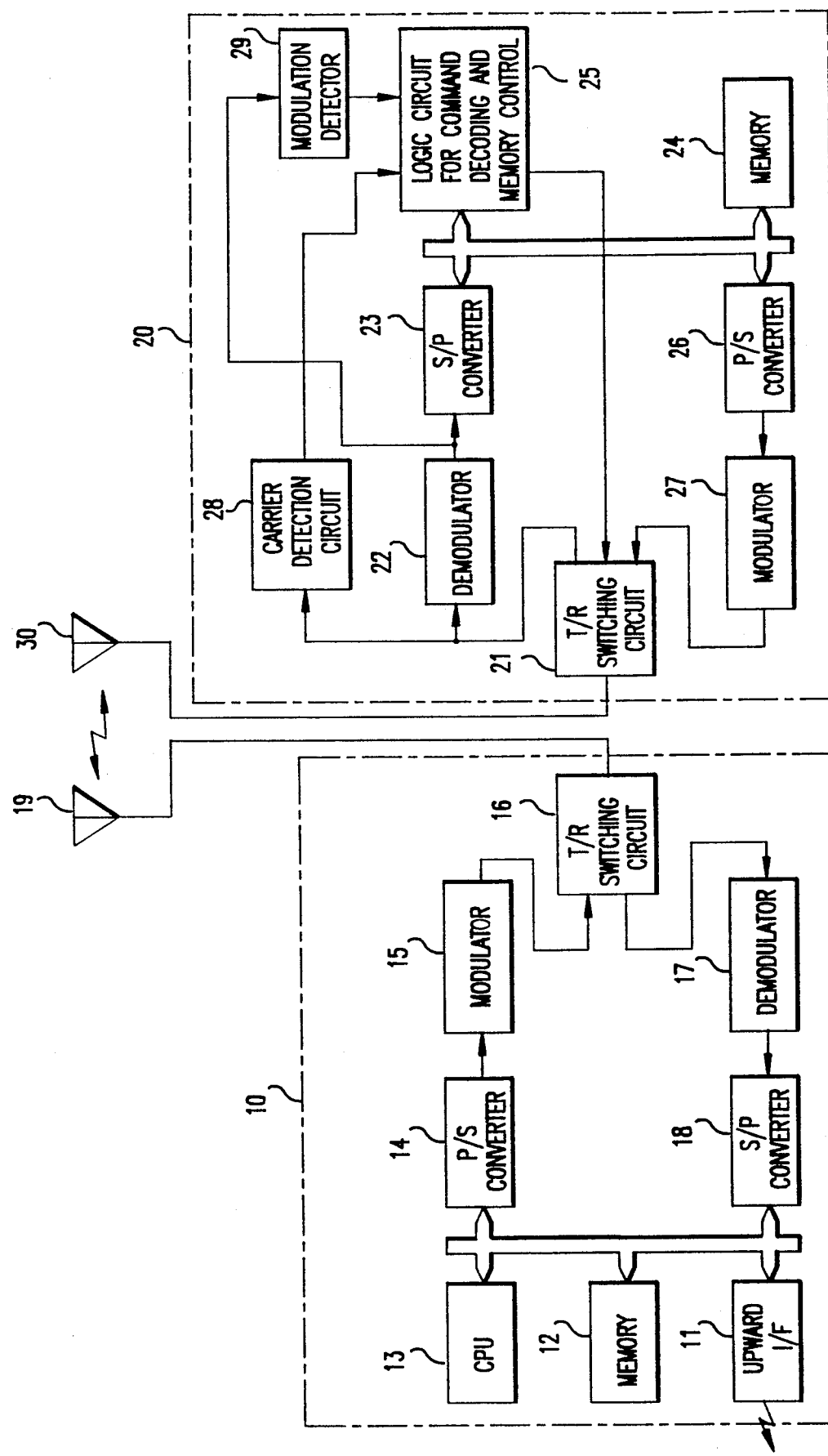
FIG. 2 is a schematic circuit diagram of a data carrier identification system according to this invention.

FIG. 2 shows a circuit configuration of an identification apparatus according to this invention. The apparatus includes a communication controller 10 which transmits read/write commands to one or more data carriers 20. Controller 10 is linked to a central control and management system which forms no part of this invention and which is therefore not shown. The central control and management system communicates with a plurality of communication controllers 10. A data carrier 20, also termed a data storing unit, reads and writes data from and into its memory in response to read/write commands from controller 10.

Controller 10 includes an interface 11 which is used to communicate with the central control and management system. A memory 12 is used to store a plurality of data carrier numbers which are different from each other, each of which is associated with and identifies a respective data carrier 20. A central processing unit (CPU) 13 works as the heart of controller 10. Parallel/-Serial (P/S) converter 14 receives parallel signals such as command signals from CPU 13 and converts them into serial signals. A modulator 15 modulates serial signals from P/S converter 14 and transmits them via transmit/receive switch circuit 16 and antenna 19 to a data carrier 20. Switching circuit 16 is driven by CPU 13 to switch between a signal transmitting mode and a signal receiving mode. A demodulator 17 demodulates signals transmitted from a data carrier 20 to controller 10. Signals from data carrier 20 are received by antenna 19, pass through switching circuit 16, and are demodulated by demodulator 17, which serially outputs the demodulated signals. Serial/parallel (S/P) converter 18 converts the serial signals into parallel signals.

Data carrier 20 includes a transmit/receiving switching circuit 21 which, like switching circuit 16, switches between a signal transmitting mode and a signal receiving mode. A demodulator 22 demodulates modulated signals received from controller 10 via antenna 30 and switching circuit 21, and serial/parallel (S/P) converter 23 converts serial demodulated signals from demodulator 22 into parallel signals. A memory 24 such as an EEPROM is used to store data. A logic circuit 25 for command decoding and memory control receives commands from controller 10 and decodes them to read or write data into memory 24. Switching circuit 21 is controlled by logic circuit 25. A parallel/serial (P/S) converter 26 converts parallel signals, which carry a response from data carrier 20, into serial signals which can be transmitted to controller 10. A modulator 27 modulates serial signals from P/S converter 26 and outputs them to controller 10 via switching circuit 21 and antenna 30 connected to circuit 21. A carrier detection circuit 28 detects a carrier signal from controller 10 and provides an output signal indicating whether or not the data carrier 20 is present in an area where the data carrier 20 can communicate with controller 10. A modulation detector 29 receives signals from demodulator 22 and provides an output signal indicating whether or not data communication between controller 10 and another data carrier 20 is being performed.

As an illustration of how the thus described apparatus is used, controller 10 is fixed, while data carrier 20 is mounted on objects to be identified. After data carrier 20 enters an area where data communication with controller 10 is possible, data carrier 20 begins to communicate with the controller 10. Electric power for operation of carrier 20 can be supplied by controller 10 through an electromagnetic coupling or by a battery, not show, incorporated in data carrier 20.

The data structure of command messages generated by controller 10 and transmitted to a data carrier 20 are shown in FIGS. 3A(a)–(c). As shown in FIGS. 3A(a)–(c), all commands—a read command (a), a write command (b) and a status read command (c)—include a synchronization character followed by a data carrier number (DCNo.). On the other hand, response messages (read response, write response, status read response) which are transmitted from a data carrier 20 to controller 10 in response to the above commands are respectively shown in FIGS. 3A(d)–(f). Like the command messages, all response messages, i.e., a read response, a write response and a status response, include a synchronization character followed by a DCNo.

FIG. 3B shows data structures for a DCNo. controlling command messages (a,b,c) produced by controller 10 to control whether or not a data carrier changes its DCNo. and a response message (d) from a data carrier 20. DCNo. update permitting command message (a) permits a data carrier 20 to update its DCNo. The No. updating command message (b) instructs a data carrier 20 to update its DCNo. The No. updating inhibiting command message (c) inhibits a data carrier 20 from updating its DCNo. The command messages 3B(a,b,c) are transmitted from controller 10. In response to these commands, a data carrier 20 sends controller 10 a response (d) which has a synchronization character, a DCNo. and a status message area as shown in FIG. 3B(d).

Figure 4:
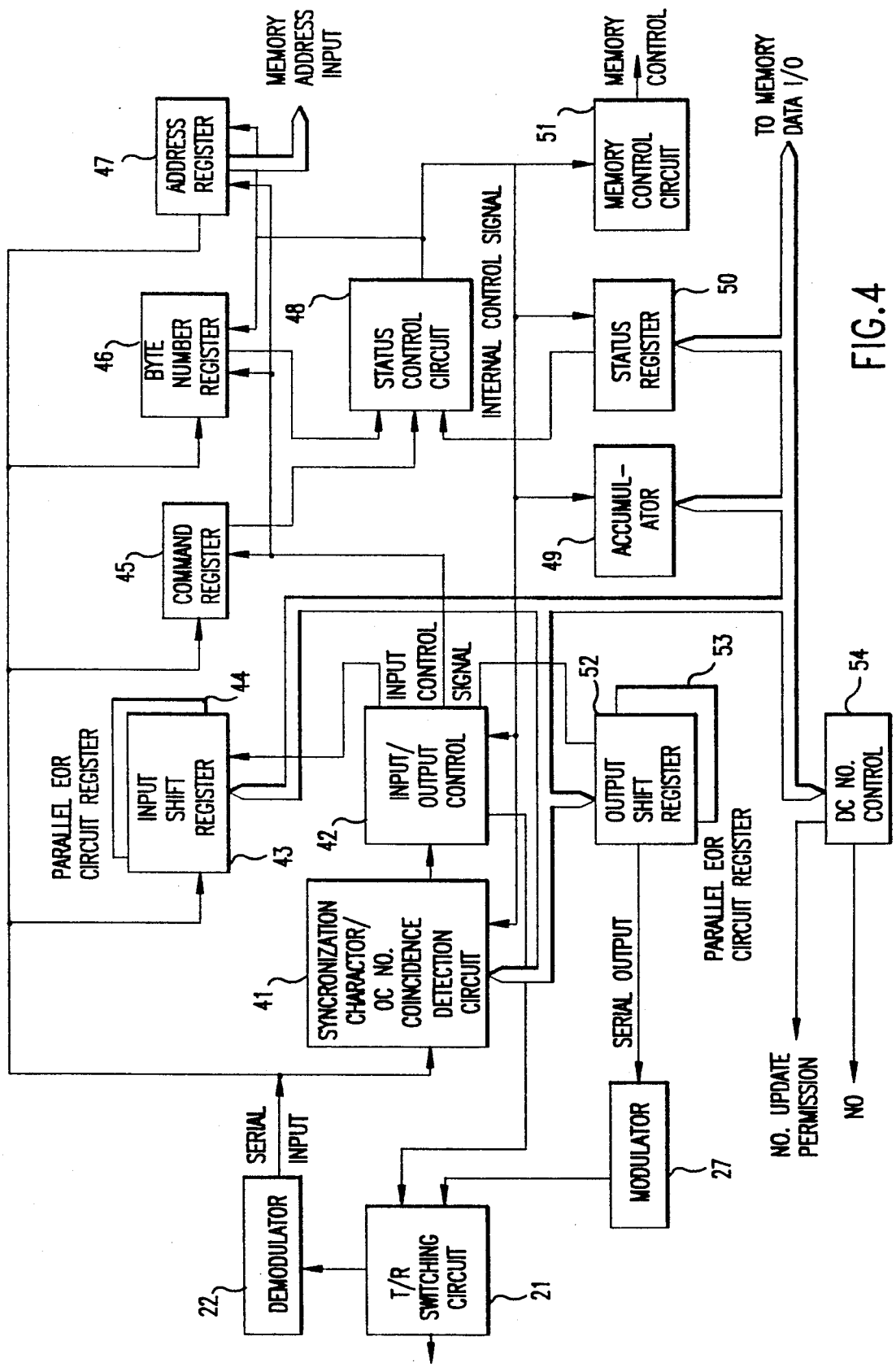
FIG. 4 is a circuit configuration for command decoding and data transfer.

A circuit configuration of the FIG. 2 logic circuit 25 is shown in detail in FIG. 4. A synchronization character/DCNo. coincidence detection circuit 41 is used to determine if a particular data carrier 20 is addressed by controller 10. The detection circuit 41 is shown in greater detail in FIG. 5. It includes a synchronization character holding register 55, a shift register 56 for storing a synchronization character of a received command input as serial data, and a comparison circuit 57 for comparing a synchronization character held by register 55 with a synchronization character stored in register 56. Circuit 57 thus determines whether or not the two synchronization characters are coincident with each other. The coincidence detection circuit 41 also includes a register 58 which holds a DCNo. of carrier 20, and a shift register 59 for storing a DCNo. contained in a command from controller 10. Shift register 59 is reset by comparison signals from comparison detecting circuit 57. A comparison circuit 60, also part of the coincidence detection circuit 41, compares the DCNo. held by register 58 and the DCNo. stored in shift register 59, and outputs a command input permitting signal upon a coincidence of the two DCNos. At this point a data carrier 20 recognizes that it has been addressed.

The transmit/receive switching circuit 21 is controlled by input/output control circuit 42 and status control circuit 48. If the input of, for example, a READ command from controller 10 is completed, status control circuit 48 transmits an internal control signal to control circuit 42. Upon receiving the internal control signal, control circuit 42 sends an electric signal to switching circuit 21. Switching circuit 21 is changed into a signal transmission mode upon receiving the signal from control circuit 42.

A data carrier 20 identification operation will now be described with reference to FIGS. 1A–1E.

Figure 1A:
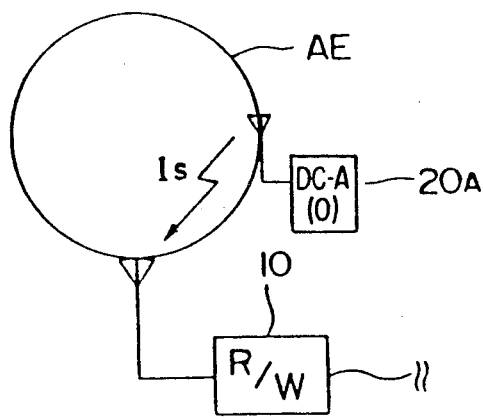
FIGS. 1A to 1E are illustrations representing a data carrier identification system in a first preferred embodiment of this invention.
Figure 1B:
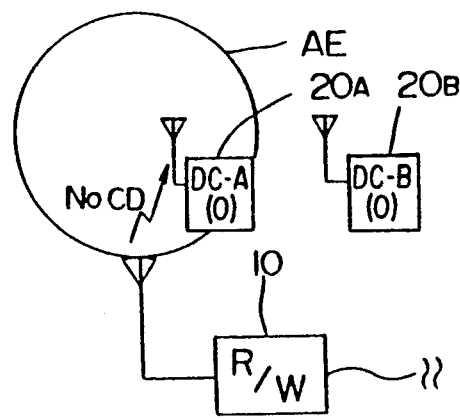
Figure 1C:
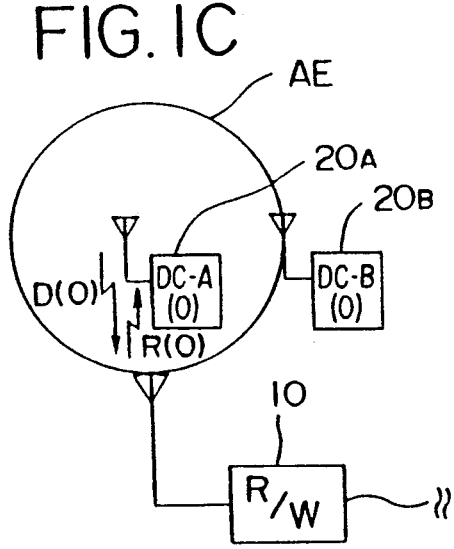

As shown in FIG. 1A, when a data carrier 20A enters an access enable (AE) area where data communication with controller 10 is possible, it begins to detect with a carrier detection circuit 28 a carrier signal from controller 10 and sets its logic circuit 25 upon detection of a carrier signal. At this phase, the DCNo. of data carrier 20A is zero, which can be updated. Data carrier 20A determines whether or not other data carriers are communicating with controller 10 by monitoring the output of demodulator 22 with modulation detector 20. If no data carriers which are communicating with controller 10 are found a signal indicating this occurs at the output of modulation detector 29 and, data carrier 20A, in response, transmits an initial status (IS) signal to controller 10 that carrier 20A has entered the AE (communication) area. In response to the IS signal, controller 10 transmits a No. update inhibiting command (FIG. 3B(c)) to carrier 20A to fix the DCNo. of carrier 20A at "0". The controller 10 fixes the DCNo. of carrier 20A at "0" because there are no other data carriers in the access enable area and thus there is no DCNo. conflict. Where controller 10 performs a read access to carrier 20A, controller 10 sends, as shown in FIG. 1C, a read command message (FIG. 3A(a)) together with the DCNo. (0) to carrier 20A and receives a response therefrom.

Figure 1D:
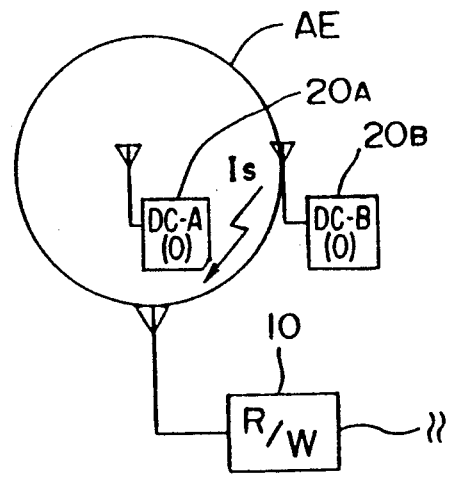
Figure 1E:
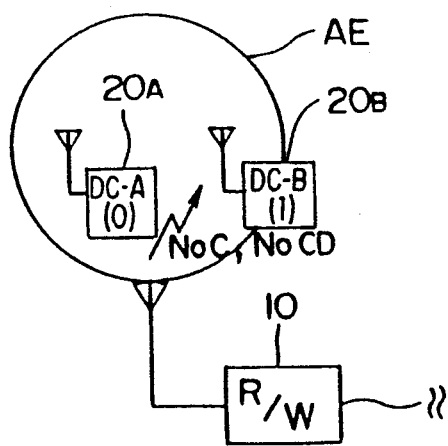

A logic circuit 25 of another data carrier 20B, which now enters the access enable (AE) area, and which also has an initial DCNo. (0), is also set by a carrier signal from controller 10. Data carrier 20B has come into the AE area, as shown in FIG. 1D, during the communication of data carrier 20A with controller 10. Data carrier 20B transmits an IS signal to controller 10 upon detection that data carrier 20A is not in communication with controller 10. In response to the IS signal from data carrier 20B, controller 10 outputs a command to carrier 20B. In this case, since there are now two data carriers with a DCNo. (0) controller 10 issues a No. updating command (FIG. 3B(b)) to data carrier 20B, as shown in FIG. 1E, because the DCNo. (0) of carrier 20B is equal to that of data carrier 20A which is still present in the AE area. In response to receipt of this command, carrier 20B replaces the current DCNo. (0) with a new DCNo. (1). Thereafter, controller 10 transmits a No. update inhibiting command (FIG. 3B(c)) to carrier 20B to fix its DCNo. at (1). It is noted that when communicating the No. updating command to data carrier 20B, both data carriers 20A and 20B temporarily have the same DCNo. and are thus both addressed. However, only the data carrier 20B has its DCNo. updated because previously the data carrier 20A received a No. update inhibiting command which fixed the DCNo. of data carrier 20A at (0). A change of this DCNo. would first require receipt of a No. update permitting command such as occurs when a data carrier 20 leaves an access enable area, as described below.

If another data carrier 20C, not shown, subsequently enters the AE area during the presence of data carriers 20A and 20B therein, the DCNo.(0) of carrier 20C is replaced through communications with controller 10 with a new DCNo. (2). The consecutive DCNos. thus obtained allow controller 10 to correctly address a specific data carrier 20 even if more than one data carrier 20 exists in the AE area.

FIG. 3B(a) illustrates a No. update permitting command. This command is issued by controller 10 to a data carrier 20 which is leaving an access enable area, that is, a communication area. It enables a leaving data carrier 20 to be updated by a No. updating command FIG. 3B(b) of another controller when it enters the access enable area of the other controller.

Figure 6A:
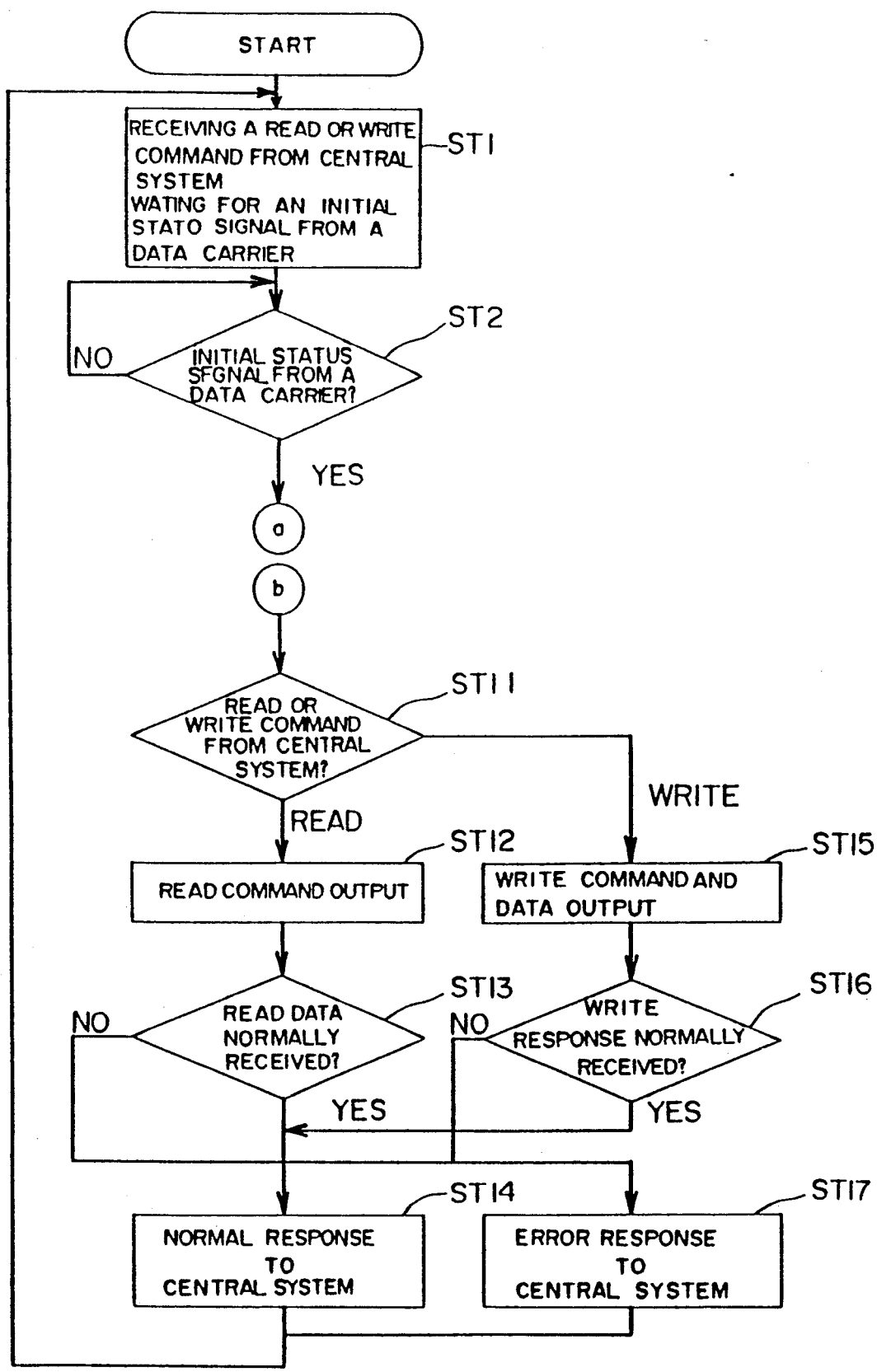
Figure 6B:
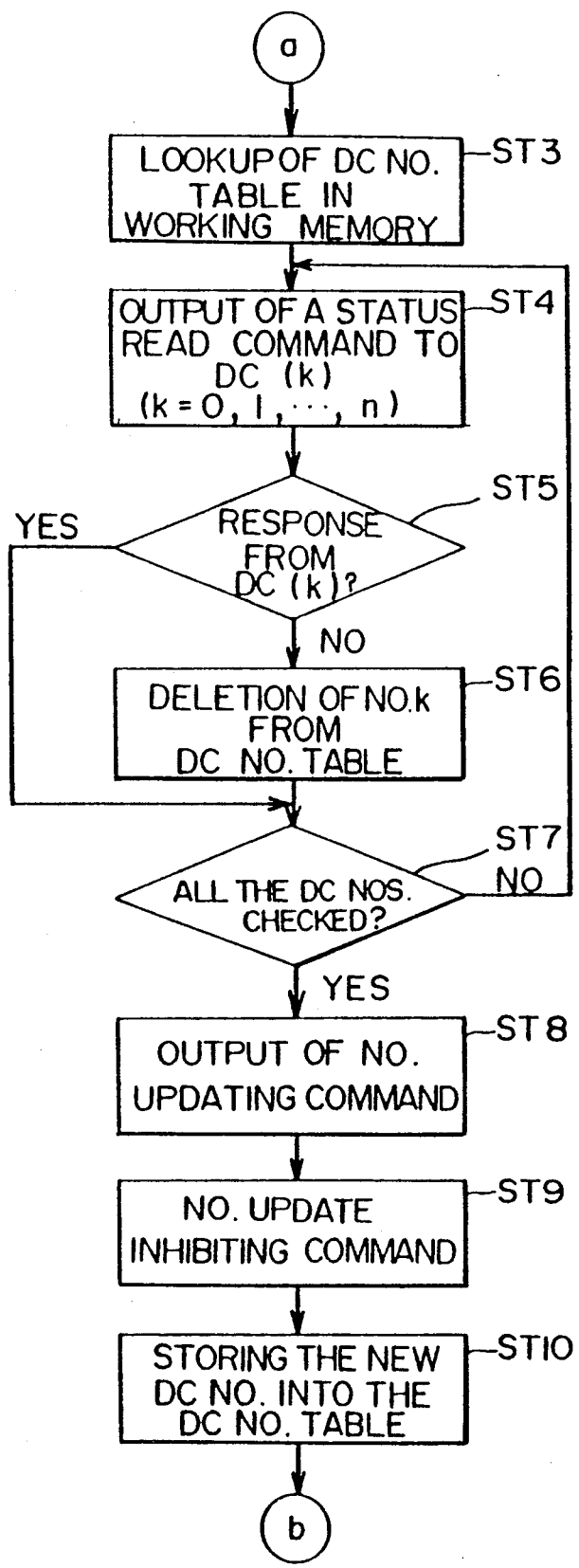

Operation of controller 10 in a first embodiment of the invention is described below referring to FIGS. 6A and 6B.

In step 1(ST 1), controller 10 receives a read or write command from the central control and management system (central system), and waits for an initial status (IS) signal from a data carrier 20. In ST 2, it is determined whether or not controller 10 has received an IS signal from a data carrier. If an IS signal is received in ST 2, controller 10 looks up in ST 3 a DC No. table which resides in working memory 12 and which contains data carrier numbers. In ST 4, controller 10 outputs a status read command (FIG. 3B(c)) to the data carrier having the data carrier number (k) (k=0, 1, ... or n). In ST 5, it is determined whether or not a response from the data carrier (k) has been received. If a response from the data carrier (k) is not received, the number k is deleted from the DC No. table,. Thereafter, in ST 7, it is determined whether or not all the data carrier numbers stored in the DCNo. table have been checked. If a response from the data carrier (k) is received in ST 5, ST 7 is executed skipping ST 6. In ST 9, a DC No. updating command (FIG. 3B(b)) is sent to a data carrier (0) the IS signal from which is received in ST 2. Upon receiving the No. updating command, the data carrier (0) updates the current carrier number 0 with a new number which is different from all the data carrier numbers existing in the DC No. table. Thereafter, the No. update inhibiting command (FIG. 3B(c)) is transmitted to the data carrier having the new number to fix the new number. In ST 10, the new number is stored into the DC No. table. Then, in ST 11, it is determined whether or not a READ command or a WRITE command has been transmitted from the central system to controller 10. If a READ command is received in ST 11, ST 12 is executed to output the READ command (FIG. 3A(a)) to the data carrier specified in the READ command. Thereafter, in ST 13, it is determined whether or not read data have been properly received by controller 10. If the read data are properly received in ST 13, a normal response signal is transmitted to the central system in ST 14. In contrast, if the read data are not properly received in ST 13, ST 17 is executed to transmit an error response signal to the central system. In ST 17, the error response signal is sent to the central system if the specified data carrier does not exist in the AE area.

On the other hand, if a WRITE command is received from the central system in ST 11, ST 15 is executed to output the WRITE command (FIG. 3A(b)) to the data carrier specified in the WRITE command. Then, in ST 16, it is determined whether or not a write response signal (FIG. 3A(a)), which indicates that the data have been normal written into the addressed data carrier, is received. If the write response signal is received in ST 16, a normal response signal is transmitted to the central system in ST 14. In contrast, if the write response signal is not received in ST 16, an error response signal is transmitted to the central system in ST 17. As in the case of the READ command, the error response signal is also sent to the central system if the specified data carrier does not exist in the AE area.

Figure 5:
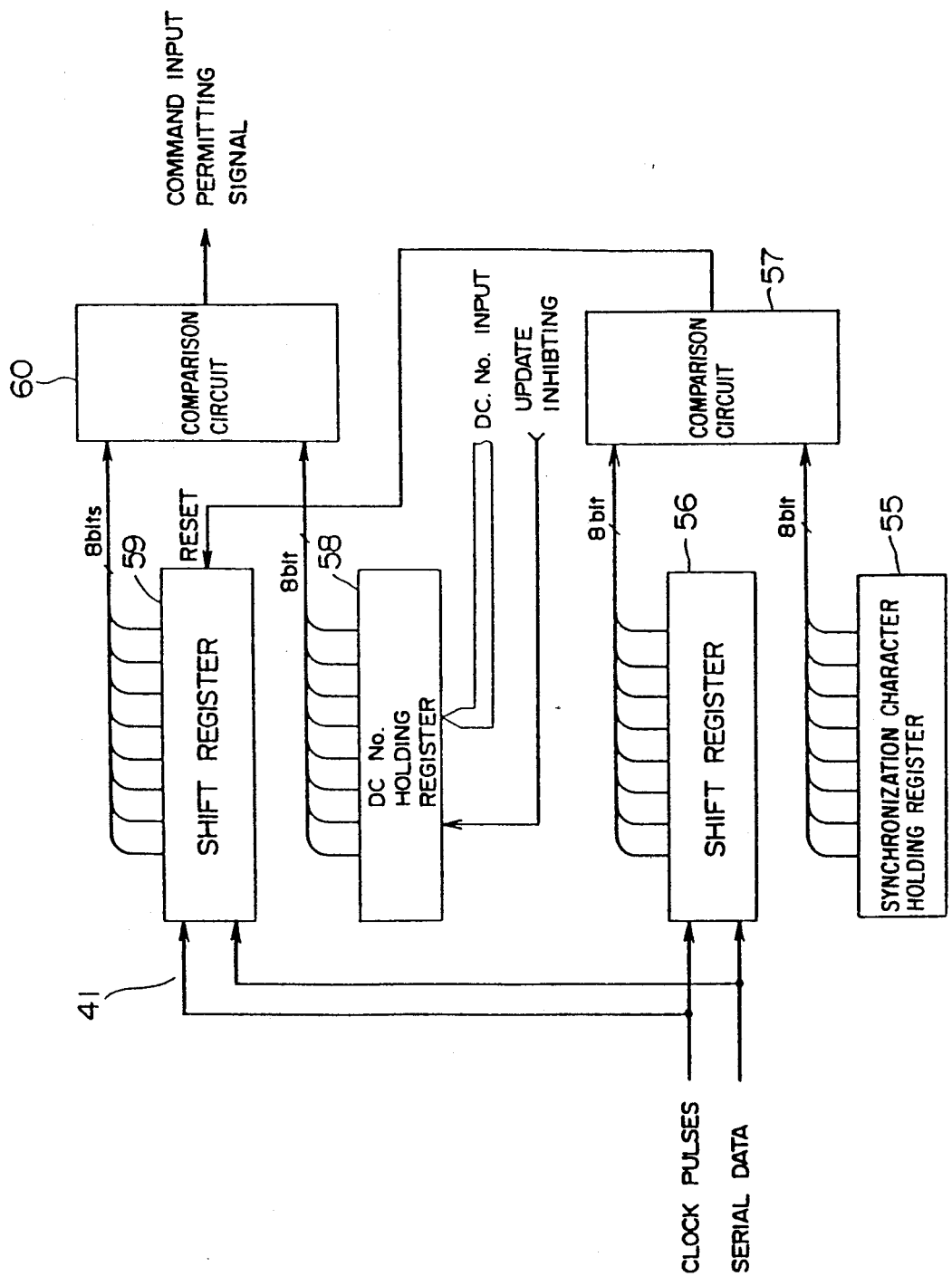
FIG. 5 is a circuit configuration for detecting coincidence of a data carrier (DC) number from a controller with the DC number of a data carrier.

The data communication between data carriers 20 and controller 10 is described below in greater detail referring to FIG. 4, FIG. 5, and the flow charts of FIGS. 7A–7C.

After a data carrier 20 enters the AE area, carrier detection circuit 28 thereof detects a carrier signal from controller 10 and feeds the signal to logic circuit 25. Logic circuit 25 begins to operate upon the carrier signal following the flow chart shown in FIG. 7A. First of all, in step 1 (ST1), circuit 25 checks a signal from modulation detector 29 to determine whether or not a modulated signal is received. When controller 10 is communicating with another data carrier, the data carrier remains in ST1. When controller 10 is not communicating with any data carriers, no modulated signals can be found. Accordingly, ST2 is executed. In ST2, a synchronization character and a DCNo. of data carrier 20 are stored into output shift register 52. Then, in ST3, an initial status (IS) signal, produced by status control circuit 48 sending a control signal to status register 50 which contains the IS signal, is fed via accumulator 49 to register 52, where the IS signal is stored and transmitted.

Thereafter, detection circuit 41 looks for a synchronization character, that is, a command from controller 10 in ST4. After this, in ST5, a DCNo. received from controller 10 is checked to determine whether or not it is coincident with the DCNo. of data carrier 20. If at least one of the results in steps 4 and 5 is no, data carrier 20 waits in steps ST4, ST5 for a command from controller 10 without executing the following steps.

If both the results in steps 4 and 5 are yes, the received command from controller 10 is stored into command register 45 in ST6. Status control circuit 48 decodes the command and sets a status message into status register 50 in ST7 indicating receipt of a command. Where the command turns out to be a No. update inhibiting command (FIG. 3B(c)), a DCNo. update inhibiting signal to be inputted into register 58 (FIG. 5) is set high in ST8. Thereafter, turning back to ST2, the synchronization character and the DCNo. are stored into shift register 52 and released therefrom in ST2. The status message stored in status register 50 is also stored into register 52 and transmitted therefrom in ST3. A response including the synchronization character, the DCNo. and the status message is thus transmitted to controller 10.

If the command decoded by a data carrier 20 is a No. updating command (FIG. 3B(b) (No. C)) in ST7, a new No. is stored into accumulator 49 in ST9. The new No. stored in accumulator 49 is then transferred to register 58 (FIG. 5) in ST10. The DCNo. of data carrier 20 is thus updated. After the updating, and a return to ST2, a response is released by data carrier 20 to controller 10. Then, data carrier 20 waits for another command.

If the command proves to be a No. update permitting command (FIG. 3B(a) (No. CE) in ST 7, the DCNo. update inhibiting signal to register 58 (FIG. 5) is set low in ST11. Thereafter, logic circuit performs steps 2 and 3 to release a response to controller 10.

If the command is found to be a read command (FIG. 3A(a)) in ST7, a numeral contained in the command for specifying the number of bytes is stored into byte count register 46 in ST12. Then, a reading start address also contained in the command is stored into address register 47 in ST13. Thereafter, a synchronization character and a DCNo. are outputted via shift register 52 in ST14, and a status message stored in register 59 is also released via register 52 in ST15. Controller 10 can thus know that carrier 20 has received the command. In ST16, status control circuit 48 instructs memory control circuit 51 to access the address, which is specified by address register 47, of memory 24 to read data from the address. The readout data is stored into accumulator 49 in ST17, the data stored in accumulator 49 is then outputted via register 52, while it is stored into parallel Exclusive OR(EOR) circuit register 53. The number stored in byte count register 46 is reduced by one in ST18. The number stored in register 46 is then checked to determine whether or not it is zero. If the number is not zero, it means that data to be read still remains. The current address stored in address register 47 is accordingly increased by one in ST20. Thereafter, steps 16-19 are executed to read the remaining data from the increased address. The read operation is iterated until all the remaining data are read out. The data are thus read out one-by-one. On the other hand, if the number of register 46 is found to be zero in ST19, this means that data to be read no longer exits. The content of EOR circuit 53 is released via register 52 as check data (check bit) in ST21. At this point the read response (FIG. 3A(d) has been set. Then, logic circuit 25 returns to ST4, where circuit 25 waits for another command from controller 10.

If the command is found to be write command (FIG. 3A (b)) in ST17, a numeral contained in the write command for specifying the number of bytes is stored into register 46 in ST22. Then, a writing start address also contained in the write command is stored into address register 47 in ST23. Thereafter, data to be inputted into memory 24 are stored into register 43 are further stored into parallel exclusive OR (EOR) circuit register 44, while they are transferred to accumulator 49. In ST26, status control circuit 48 instructs memory control circuit 51 to access the address, which is specified by address register 47, of memory 24 to write data therein. The numeral stored in byte count register 46 is then checked in ST28 to see if it is zero or not. If the byte count is not zero, this means that data to be written still remains. The current address contained in address register 47 is accordingly increased one in ST29. Thereafter, steps 24-28 are executed to write the remaining data into the increased address. The write operation is thus repeated until all the data are written into memory 24. The data are thus written into memory 24 one by one. In contrast, if the byte count is found to be zero in ST28, this means that data to be written no longer exists. A check bit is then inputted into register 43 (ST30), and an even parity check is performed using the check bit in ST31 to see if the content of EOR circuit register 44 is zero or not. If it is found out that the content is not zero, an error flag is set as a status (ST32) before returning to ST2. The synchronization character and the DCNo. are outputted via register 52 (ST2), and the status is also outputted via register 52 (ST3). A write response (FIG. 3A(a)) including the above synchronization character, the DCNo. and the status is thus transmitted to controller 10. Thereafter, data carrier 20 waits for another command in ST4.

FIGS. 8-11 show a second embodiment of this invention. Circuit configurations of the second embodiment are the same as those of the first embodiment and a description of them is accordingly omitted. A "DCNo.+1" command is shown in FIG. 9(a). If a data carrier 20 receives a "DCNo.+1" command from controller 10, the carrier increases its current DCNo. by one. The other commands and responses are identical to those shown in FIG. 3A.

A data carrier 20 identification operation performed by the second embodiment of the invention is now described referring to FIGS. 8A-8H.

As shown in FIG. 8A, after entering an access enable (AE) area, logic circuit 25 of data carrier 20A begins to operate upon a carrier signal form controller 10. At this stage, carrier 20A has the number (0) as its DCNo. Carrier 20A determines whether or not other data carriers are in communication with controller 10 by monitoring the output of modulation detector 29. If no data carrier is communicating with controller 10, carrier 20A releases an IS signal, which includes the DCNo. (0) and a status message to controller 10 to indicate that carrier 20A has entered the AE area. Receiving the IS signal, controller 10 knows of the entering of carrier 20A into the AE area. As shown in FIG. 8B, controller 10 then transmits a "DCNo.+1" (Ia) command (FIG. 9(g)) to carrier 20A. In response to the Ia command, carrier 20A increases its current DCNo. (0) by one to obtain a new number, namely, DCNo. (1). When controller 10 issues a read command to carrier 20A, controller 10 produces a read command including the DCNo. (1) as shown in FIG. 8C. Controller 10 thus acquires a response from carrier 20A.

A logic circuit 25 of another data carrier 20B which has entered the AE area, as shown in FIG. 8D, where carrier 20A is still present in the AE area, is also set by a carrier signal from controller 10. Carrier 20B transmits an IS signal to controller 10 if carrier 20B detects that carrier 20A is not communicating with controller 10. Upon receiving the IS signal, controller 10 transmits, as shown in FIG. 8E, the Ia command to carriers 20A and 20B. Data carrier 20B updates the current DCNo. (0) with a new DCNo. (1) in response to the Ia command. At the same time, data carrier 20A also increments the current DCNo. (1) to a new DCNo. (2) in response to the Ia command.

Figure 8G:
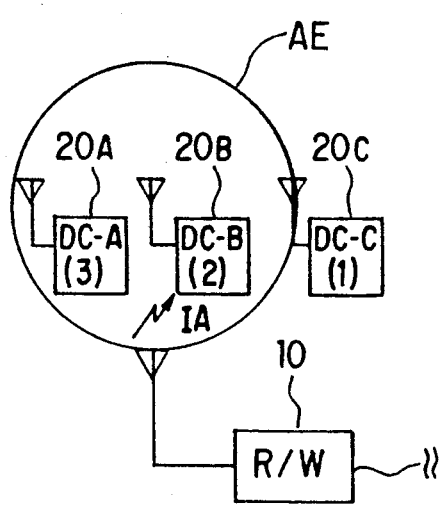
Figure 8H:
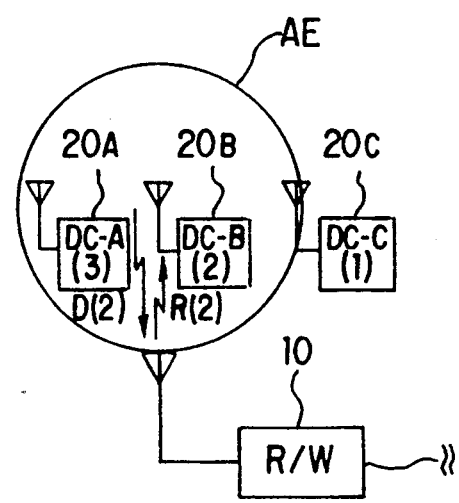

Another data carrier 20C, upon entering the AE area, also outputs an IS signal to controller 10 as shown in FIG. 8F. Data carrier 20C has entered the AE area where the other two carriers 20A and 20B are still present. Controller 10 transmits the Ia command (FIG. 9(g)) to carriers 20A, 20B and 20C in response to the IS signal from carrier 20C. Carrier 20C replaces the current DCNo. (0) with a new DCNo. (1) in response to the Ia command. Upon receiving the Ia command, carriers 20A and 20B also update their DCNos. (2) and (1) with new DCNos. (3) and (2), respectively. As shown in FIG. 8G, the three consecutive numbers (3), (2) and (1) are assigned to data carriers 20A, 20B and 20C, respectively. The consecutive DCNos. thus obtained allow controller 10 to correctly access a specific data carrier even if more than one data carrier is present in the AE area. Although the DCNos. are consecutively given in both the first and second embodiments, they can be odd numbers, even numbers, or numbers of different fashion.

In this situation, if read access to carrier 20B is required, controller 10 transmits a read command including the DCNo. (2). All the carriers 20A, 20B and 20C receive the read command and compare the DCNo. (2) with their DCNos. to check for coincidence. In this case, only carrier 20B performs a read operation and outputs a response to controller 10 since only it has the number DCNo. (2).

Figure 10A:
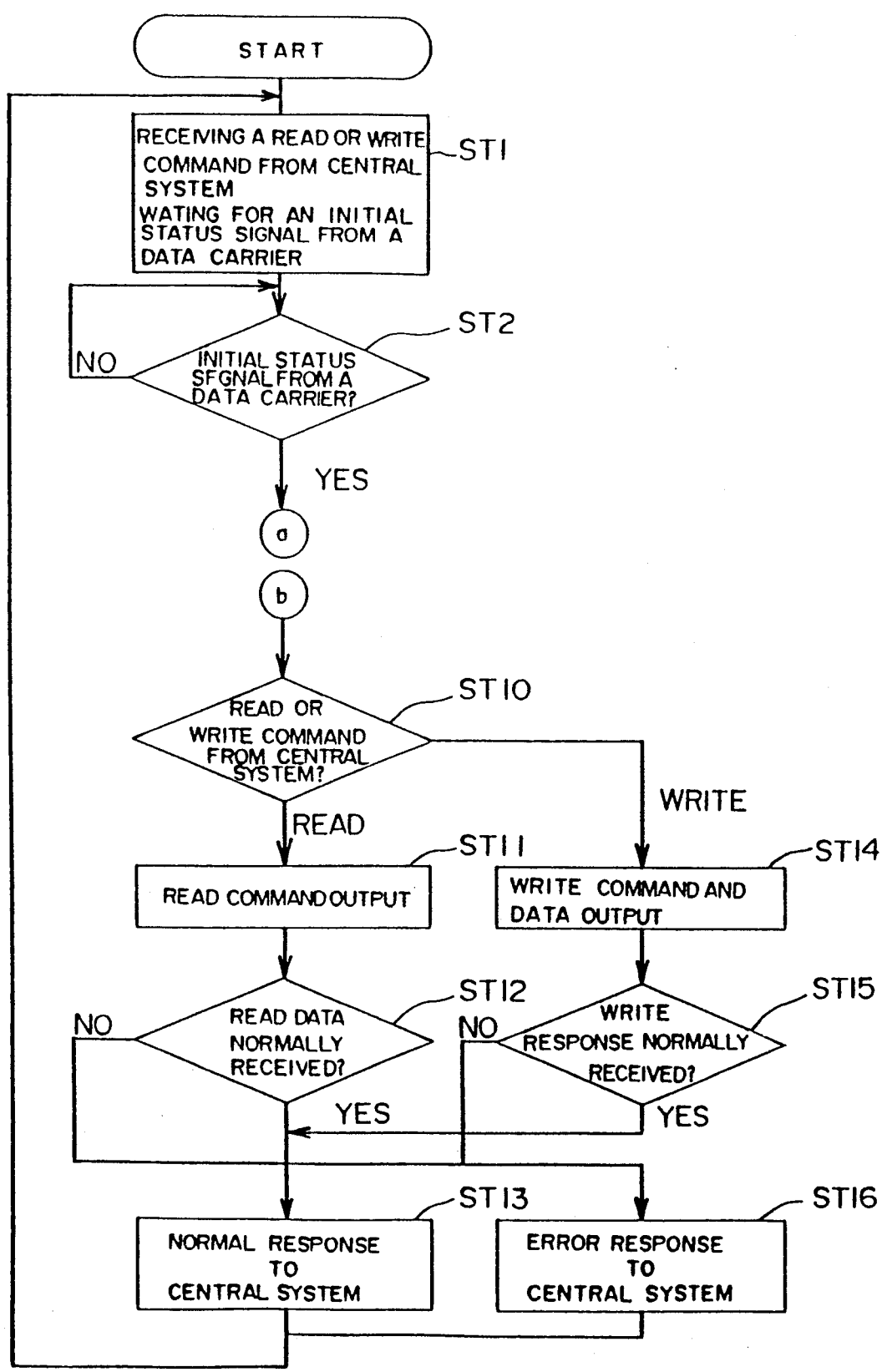
FIGS. 10A and 10B are flow charts describing operation of the controller in the second embodiment of this invention.
Figure 10B:
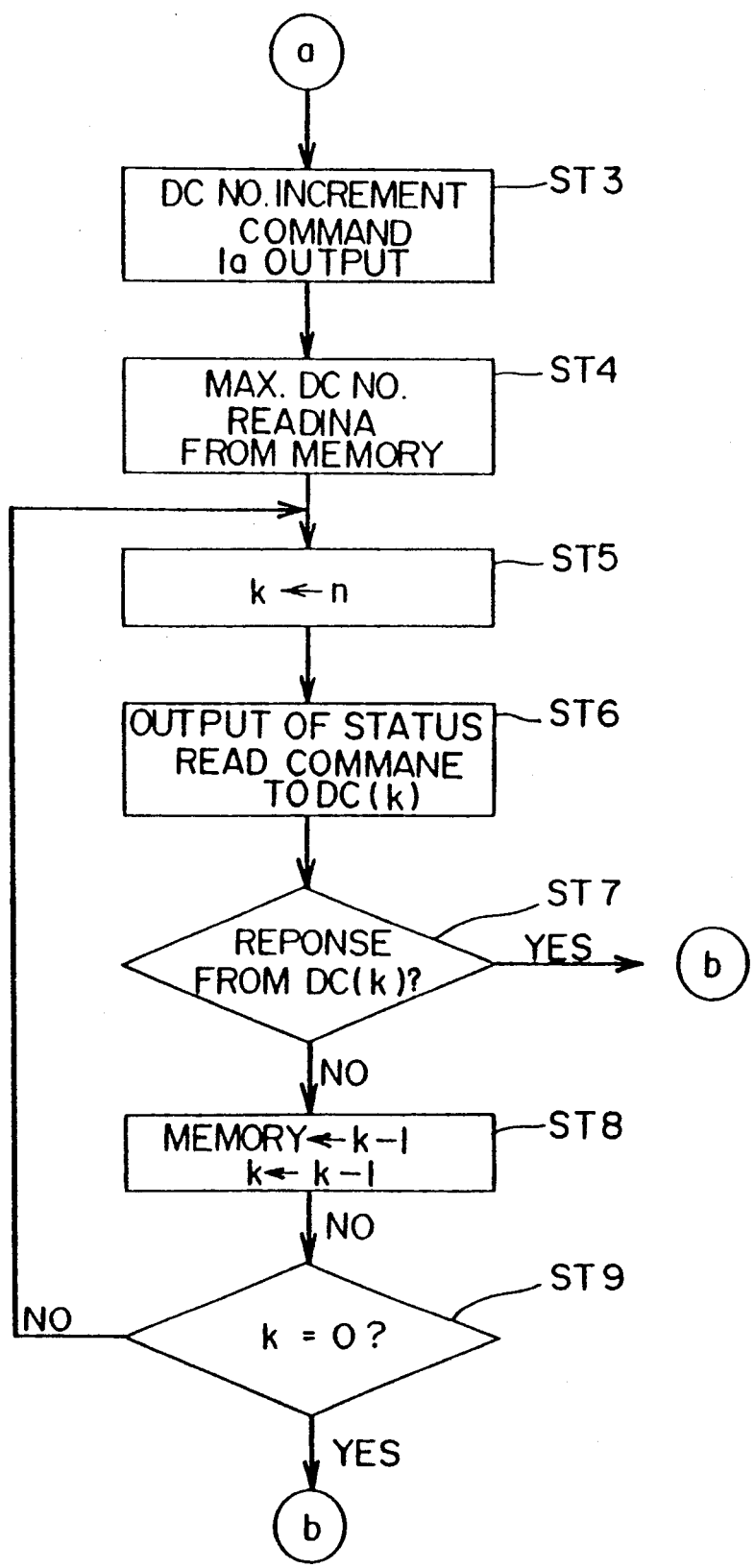

Operation of controller 10 in the second embodiment is described below referring to FIGS. 10A and 10B. Since operation of steps 1, 2, and 10 to 16 in FIGS. 10A, 10B is the same as that of steps 1, 2, and 11 to 17 shown in FIG. 6A, these steps are not described here.

In ST 3, the "DCNo.+1" (1a) command (FIG. 9(g)) is sent to all the data carriers which are present in the AE area. Upon receiving the Ia command, all the data carriers increase their data carrier numbers (DCNo.) by one. In ST 4, the maximum data carrier number n is read from memory 12. All the data carrier numbers stored in memory 12 are equal to the data carrier numbers of the data carriers existing in the AE area. Thereafter, the maximum number n is assigned to a variable k in ST 5. In ST 6, controller 10 outputs a STATUS READ command to the data carrier (k). In ST 7, it is determined whether or not controller 10 has received a response signal from the data carrier (k). If controller 10 has not received the response signal in ST 7, ST 8 is executed.

In ST 8, a number k−1 is stored in memory 12, and the number k−1 is assigned to the variable k. Then, in ST 9, it is determined whether or not the variable k is zero. If the variable k is not zero, ST 5 is repeated. If controller 10 has received the response signal in ST 7, or if the variable k is found to be zero in ST 9, ST 10 and the following steps are executed.

Data communication between a data carrier 20 and controller 10 is partly described below referring to FIGS. 4, 5 and 11.

Figure 7A:
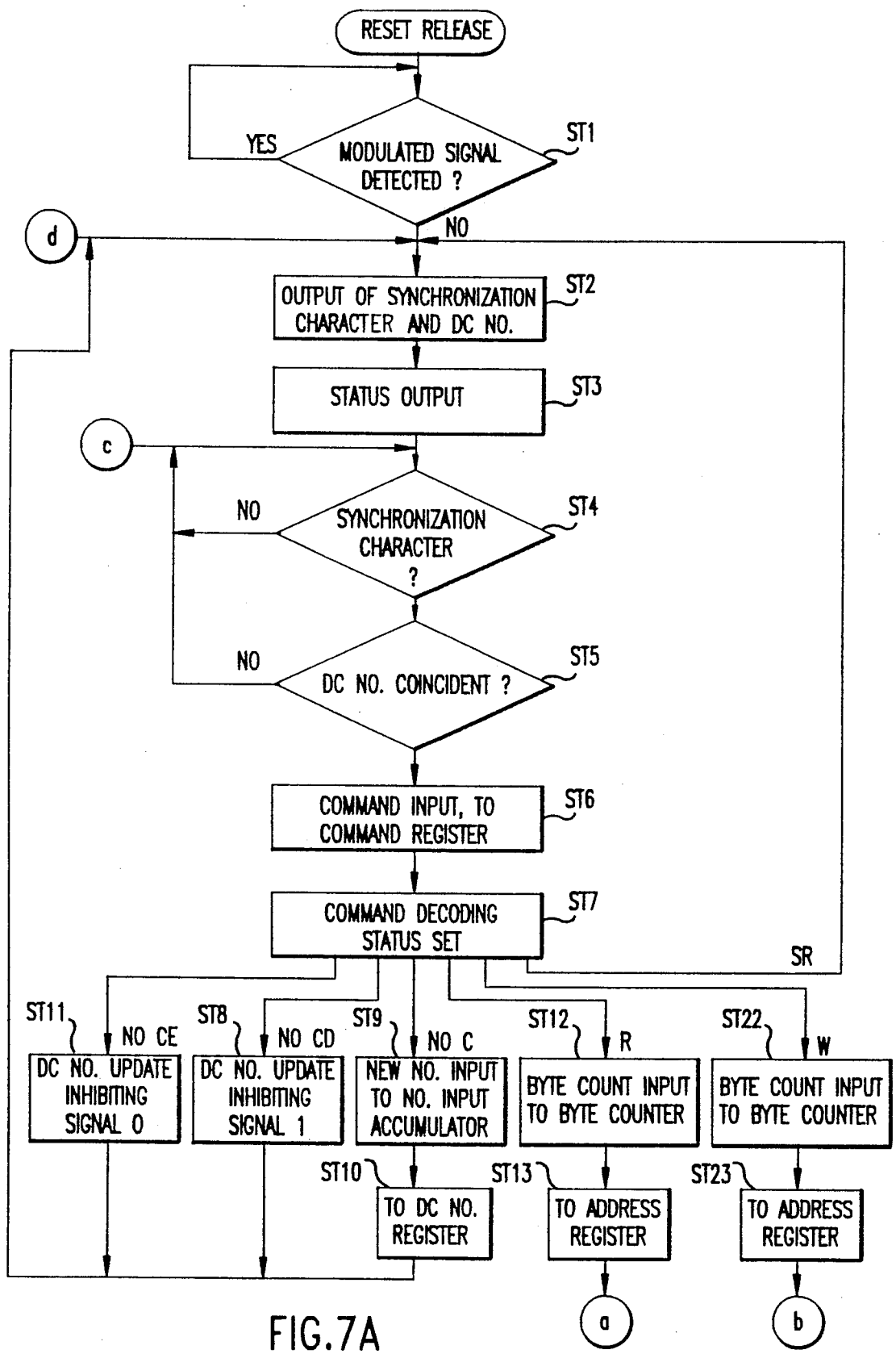
FIGS. 7A, 7B and 7C are flow charts illustrating the operation of the first embodiment of this invention.
Figure 11:
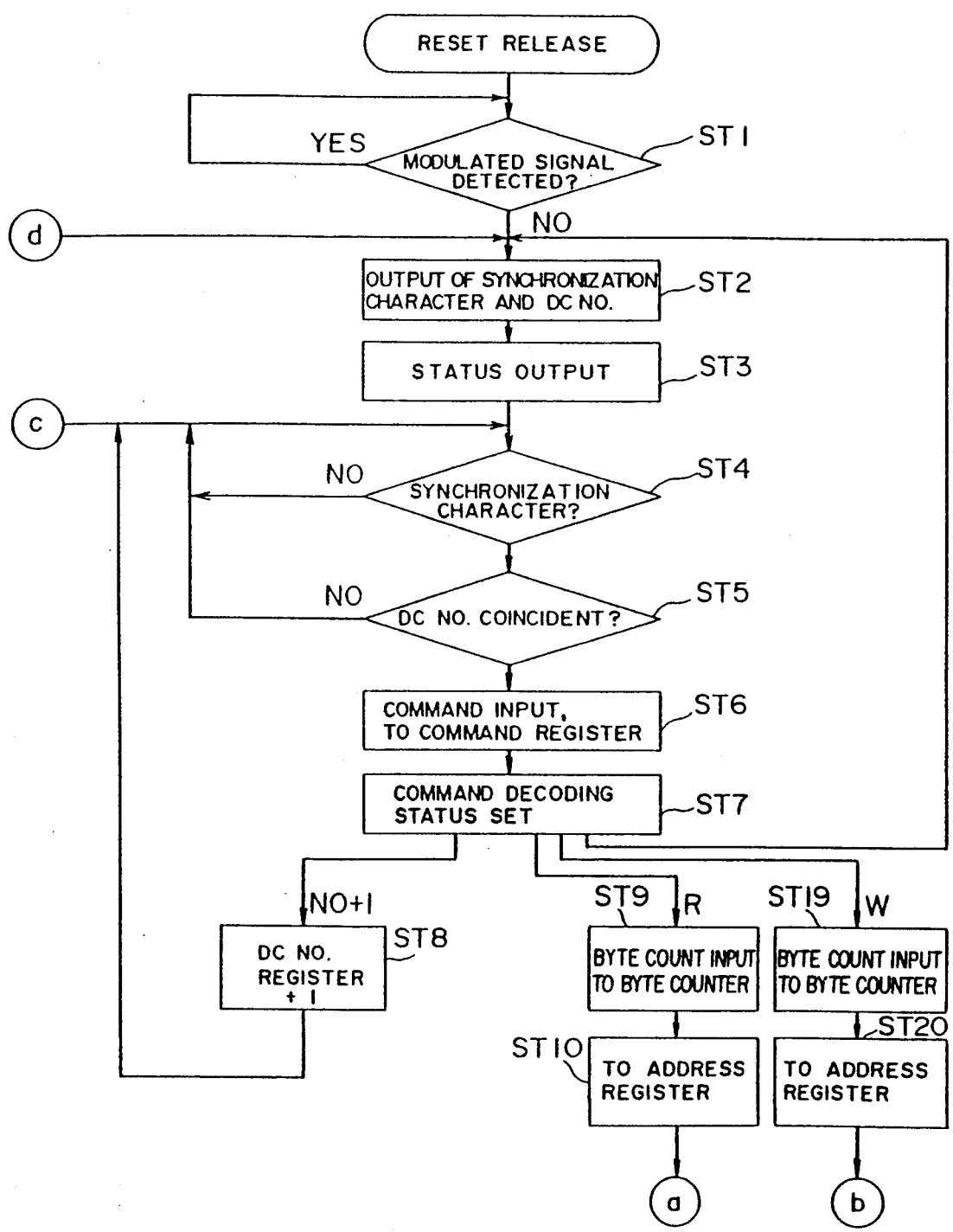
FIG. 11 is a flow chart illustrating the operation of the second embodiment of this invention.

Since operation of ST1-ST6 in FIG. 11 is the same as that of ST1-ST6 shown in FIG. 7A, a description thereof is not repeated here.

In ST7, status control circuit 48 decodes a command from controller 10, and sets a current status message of carrier 20 into status register 50. The status is outputted via register 52 to controller 10 in ST12. If the command is found to be a "DCNo.+1" command in ST7, the current DCNo. contained in register 58 is increased by one in ST8. The increased DCNo. is transmitted to controller 10 in ST11. After executing ST8, logic circuit 25 returns to ST4 to wait for another command from controller 10.

Figure 7B:
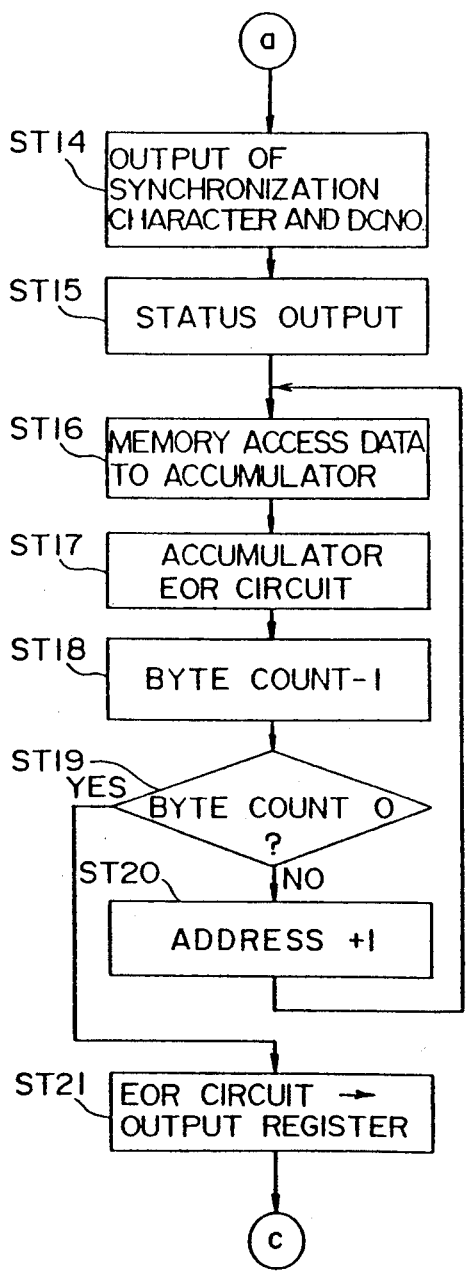
Figure 7C:
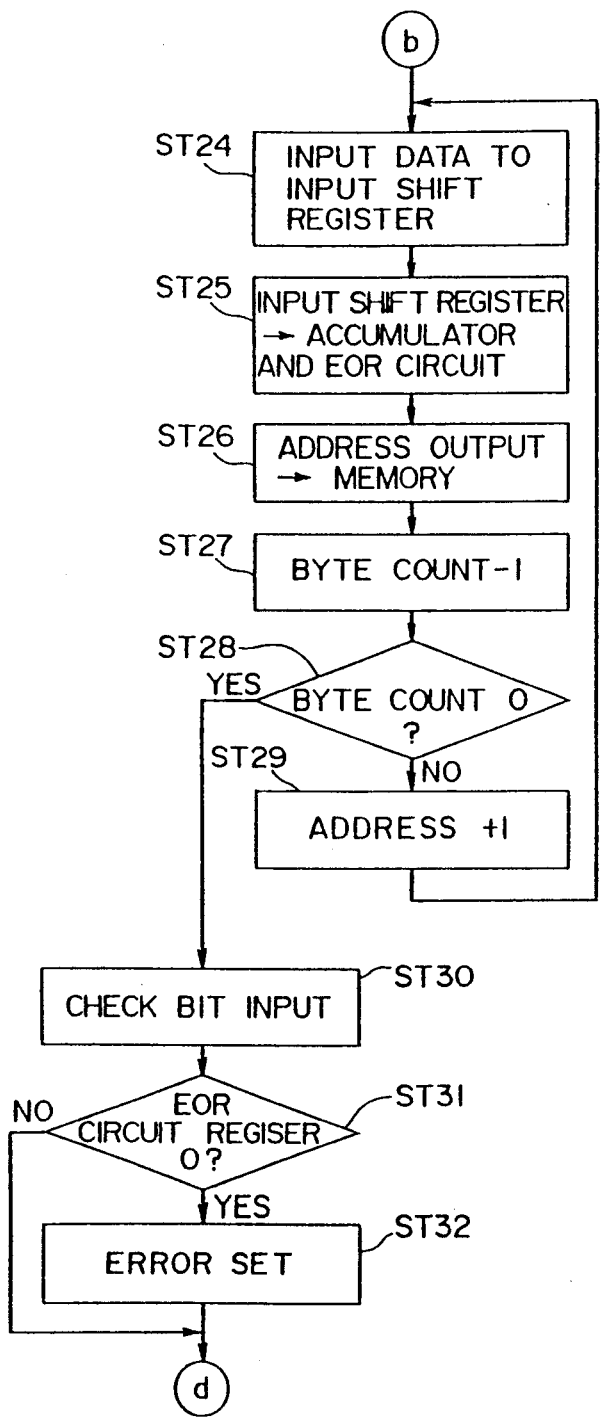

Since operation of the following routines ST9-ST29 in FIG. 11 is identical to that of the routines ST12-ST32 shown in FIGS. 7A, 7B and 7C, a description of this operation is not repeated here.

The above description and the accompanying drawings are merely illustrative of the application of the principles of the present invention and are not limiting. Numerous other arrangements which employ the principles of the invention and which fall within its spirit and scope may be readily devised by those skilled in the art. Accordingly, the invention is not limited by the foregoing description, but only limited by the scope of the appended claims.

We claim:

1. A controller for communicating with at least one data carrier within a communications areas, each data carrier having a unique data carrier identification number when in said area, said controller comprising:

storage means for storing data carrier numbers of data carriers which are present in said communications area;

detecting means for detecting a signal transmitted by a data carrier when it enters said communications area, said signal including one portion identifying entry into said communications area and another portion containing the identification number of the entering data carrier;

means responsive to detection of said signal by said detecting means for transmitting a command signal to said data carrier newly entering said communications area and all data carriers already within said communications area to increment their respective identification numbers.

* * * * *